United States Patent
Matsumoto et al.

(10) Patent No.: US 8,212,836 B2
(45) Date of Patent: Jul. 3, 2012

(54) COLOR MANAGEMENT MODULE, COLOR MANAGEMENT APPARATUS, INTEGRATED CIRCUIT, DISPLAY UNIT, AND METHOD OF COLOR MANAGEMENT

(75) Inventors: Keizo Matsumoto, Okayama (JP);
Masanobu Inoe, Okayama (JP);
Hisakazu Hitomi, Okayama (JP)

(73) Assignee: Panasonic Corporation, Osaka (JP)

(*) Notice: Subject to any disclaimer, the term of this patent is extended or adjusted under 35 U.S.C. 154(b) by 291 days.

(21) Appl. No.: 12/637,210

(22) Filed: Dec. 14, 2009

(65) Prior Publication Data

US 2010/0091034 A1    Apr. 15, 2010

Related U.S. Application Data

(63) Continuation of application No. PCT/JP2009/000548, filed on Feb. 12, 2009.

(30) Foreign Application Priority Data

Feb. 15, 2008  (JP) .................. 2008-034135

(51) Int. Cl.
*G09G 5/00* (2006.01)
*G09G 5/02* (2006.01)
*H04N 5/46* (2006.01)
*H09N 9/76* (2006.01)
*G03F 3/08* (2006.01)
*G06K 9/00* (2006.01)
*G06K 9/40* (2006.01)

(52) U.S. Cl. ........ 345/601; 345/589; 345/591; 345/604; 345/549; 348/254; 348/557; 348/599; 358/518; 358/519; 358/523; 382/162; 382/167; 382/254; 382/274

(58) Field of Classification Search .......... 345/419, 345/581, 589–591, 600–602, 604–606, 519–520, 345/549, 204; 348/253–254, 557, 582, 599, 348/674; 382/162, 167, 254, 274; 358/518–519, 358/523–525

See application file for complete search history.

(56) References Cited

U.S. PATENT DOCUMENTS 5,742,410 A * 4/1998 Suzuki ................... 358/518
5,881,211 A   3/1999 Matsumura
5,933,256 A * 8/1999 Ebner ..................... 358/520

(Continued)

FOREIGN PATENT DOCUMENTS

JP   01-188896   7/1989

(Continued)

OTHER PUBLICATIONS

Japanese Office Action issued in Japanese Patent Application No. JP 2009-519733 dated May 10, 2011.

*Primary Examiner* — Wesner Sajous

(74) *Attorney, Agent, or Firm* — McDermott Will & Emery LLP

(57) ABSTRACT

The color management module includes a first color converter color-converting color information contained in an image signal having been input according to a three-dimensional LUT; an interpolator generating a synthetic image signal by synthesizing an image signal converted by the first color converter and an image signal having been input in an arbitrary ratio; and a second color converter color-converting color information on the synthetic image signal in the HSV space and outputting the color information.

24 Claims, 13 Drawing Sheets

U.S. PATENT DOCUMENTS

| | | | |
|---|---|---|---|
| 5,953,499 A * | 9/1999 | Narendranath et al. | 358/1.9 |
| 6,580,822 B1 * | 6/2003 | Takei | 382/162 |
| 7,583,403 B2 | 9/2009 | Ito et al. | |
| 2006/0013478 A1 | 1/2006 | Ito et al. | |
| 2008/0089604 A1 * | 4/2008 | Kim et al. | 382/274 |
| 2009/0122372 A1 * | 5/2009 | Miyahara et al. | 358/520 |
| 2010/0007901 A1 | 1/2010 | Horii et al. | |
| 2010/0289835 A1 * | 11/2010 | Holub | 345/690 |

FOREIGN PATENT DOCUMENTS

| | | |
|---|---|---|
| JP | 09-224158 | 8/1997 |
| JP | 2001-008045 | 1/2001 |
| JP | 2001-203903 | 7/2001 |
| JP | 2005-266576 | 9/2005 |
| JP | 2006-287693 | 10/2006 |
| JP | 2007-019970 | 1/2007 |
| JP | 2008-017059 | 1/2008 |
| JP | 2008-017528 | 1/2008 |
| JP | 2008-301381 | 12/2008 |
| JP | 2010-017942 | 1/2010 |

* cited by examiner

COLOR MANAGEMENT MODULE, COLOR MANAGEMENT APPARATUS, INTEGRATED CIRCUIT, DISPLAY UNIT, AND METHOD OF COLOR MANAGEMENT

This application is a continuation of International Application No. PCT/JP2009/000548, whose international filing date is Feb. 12, 2009 which in turn claims the benefit of Japanese Patent Application No. 2008-034135, filed on Feb. 15, 2008, the disclosures of which Applications are incorporated by reference herein.

TECHNICAL FIELD

The present disclosure relates to a color management module, color management apparatus, integrated circuit, and display unit each performing color management such as color conversion, color correction, and color gamut conversion for an input image signal; and to a method of color management. The present disclosure relates particularly to, performing a color management process in real time according to features of an input image signal on the basis of a multidimensional look-up table.

BACKGROUND ART

Conventionally, such as in a color printer, color copier, and display device, a color signal is converted to a different color space or to a different color gamut; and specific colors are converted with hue, chroma, and lightness respectively. To perform various types of color management processes with a high degree of flexibility, as well as precisely and quickly, a color management process is performed on the basis of a three-dimensional look-up table (described as LUT hereinafter).

However, preparing a large number of LUTs for optimizing color management such as according to media, signal source, and mode of color conversion, respectively, requires an extremely large memory capacity. For this reason, a technology, together with simplified LUT and matrix calculations, for example, has been developed implementing a color conversion process according to these various types of modes.

For example, patent document 1 describes an example of such a technology. FIG. 14 shows a color conversion apparatus disclosed in patent document 1. In FIG. 14, the color conversion apparatus includes input device 9000, color conversion part 9001, and output apparatus 9007. Color conversion part 9001 includes three-dimensional LUT calculation part 9002, matrix calculation part 9003 with its matrix coefficient variable, and one-dimensional LUT calculation parts 9004, 9005, 9006. Three-dimensional LUT calculation part 9002 receives a signal from input device 9000 to process a signal received from input device 9000 using a three-dimensional LUT. Matrix calculation part 9003 matrix-calculates an output from three-dimensional LUT calculation part 9002. One-dimensional LUT calculation parts 9004, 9005, 9006 calculate an output from matrix calculation part 9003 using a one-dimensional LUT. The outputs from one-dimensional LUT calculation parts 9004, 9005, 9006 are fed to output apparatus 9007. Color conversion part 9001 uses plural matrix coefficients corresponding to various types of color conversion processes. As such, each color conversion process mode can be handled without changing a three-dimensional LUT. In this color conversion part 9001, three-dimensional LUT calculation part 9002 is not flexible, and thus regular changing of color conversion mode is handled by changing a matrix coefficient of matrix calculation part 9003 and the LUT content of one-dimensional LUT calculation parts 9004, 9005, 9006.

Meanwhile, when applying a color management system according to a three-dimensional LUT to a display unit, preparing plural LUTs according to a color conversion process mode and to a signal source requires extremely large memory capacity. Further, to rewrite data in a three-dimensional LUT requiring a large memory capacity needs a long rewriting time, which is unsuitable for a real-time process while displaying a moving image.

Under the circumstances, a color conversion apparatus in view of this problem has been devised. FIG. 15 shows such an example, which is a color conversion apparatus disclosed in patent document 2. In FIG. 15, the color conversion apparatus includes first image signal converter 9102, color corrector 9103, second image signal converter 9104, and two-dimensional LUT storage 9105. First image signal converter 9102 converts input image signal 9101 to each variable of hue, lightness, and chroma using given (i.e., predetermined) formulas. Color corrector 9103 color-corrects variables of hue, lightness, and chroma converted from an input image signal by first image signal converter 9102. Color corrector 9103, when color-correcting, uses a two-dimensional LUT produced by combining two variables out of hue, lightness, and chroma, preliminarily created and retained in two-dimensional LUT storage 9105. Second image signal converter 9104 generates output image signal 9106 by applying a given second expression to hue, lightness, and chroma after color-correction, which are output from color corrector 9103. Such a configuration does not decrease the operation speed, and thus is suitable for a real-time process.

However, color conversion apparatus 9001 shown in patent document 1 aims at conversion of limited chroma and lightness; and at low-cost correction according to media and a print mode. Further, the three-dimensional LUT is not flexible. Accordingly, with adjustment of a color conversion process by changing matrix coefficients alone, the conversion characteristic becomes linear, and flexibility in color conversion is restricted within a certain range. Consequently, a color conversion process with a high degree of accuracy, such as converting only a color with a specific hue, lightness, and chroma to a color with those different; and color gamut conversion with a nonlinear characteristic.

In the case of the color conversion apparatus and color conversion method shown in patent document 2, an LUT to be used is two-dimensional and is not updated appropriately although real-time process is possible. Consequently, color conversion process with a high degree of accuracy cannot be performed.

[Patent document 1] Japanese Patent Unexamined Publication No. 2001-203903

[Patent document 2] Japanese Patent Unexamined Publication No. 2007-19970

SUMMARY OF THE INVENTION

The present disclosure enables color management (e.g. color conversion, color correction, color gamut conversion) with a higher degree of accuracy in view of problems in conventional apparatus and methods.

The color management module includes a first color converter converting color information of an input image signal; an interpolator generating a synthetic image signal by synthesizing an output from the first color converter and an input image signal; and a second color converter converting the color information on a synthetic image signal and outputting the color information.

The color management module includes a first color converter converting color information of an input image signal; a third color converter converting color information of an input image signal; an interpolator generating a synthetic image signal by synthesizing outputs from the first and third color converters; and a color converter converting color information of a synthetic image signal and outputting the color information.

The color management apparatus includes the above-described color management module.

The integrated circuit includes the above-described color management module.

The display unit includes the above-described color management module and a display device displaying an image signal from the second color converter.

The method of color management includes a first color conversion step converting color information of an input image signal; an interpolation step generating a synthetic image signal by synthesizing the image signal converted in the first color conversion step and an image signal having been input; and a second color conversion step converting color information of the synthetic image signal and outputting the color information.

REFERENCE MARKS IN THE DRAWINGS

11 First color converter (three-dimensional LUT converter)
12 Interpolator
13 Second color converter (HSV color corrector)
14 Image feature detector
15 Image adaptive interlocking controller
71 Image adaptive interlocking controller
72 LUT controller
911 Third color converter (three-dimensional LUT converter)
1301 Color space converter
1302V Lightness correction processor
1302S Chroma correction processor
1302H Hue correction processor
1304 HSV correction controller
1303 Color space reverse-converter
3001 Color management module
3002 Display device
3100 Color management apparatus
3200 Integrated circuit
3300 Display unit

DETAILED DESCRIPTION OF PREFERRED EMBODIMENTS

Hereinafter, a description is made of a color management module, integrated circuit, display unit, color management apparatus, and method of color management, according to the present disclosure with reference to the related drawings. As discussed herein, a module refers to a grouping of elements collected to implement a function and means a set of components for implementing an intended color management process in the present disclosure. For example, a module may be a circuit block for implementing the configuration of the present disclosure in an electronic circuit or integrated circuit. In the exemplary embodiments shown below, a description is made of a case where each processor is a functional block including hardware as an example; however, the same process can also be implemented by software.

First Exemplary Embodiment

Figure 1:
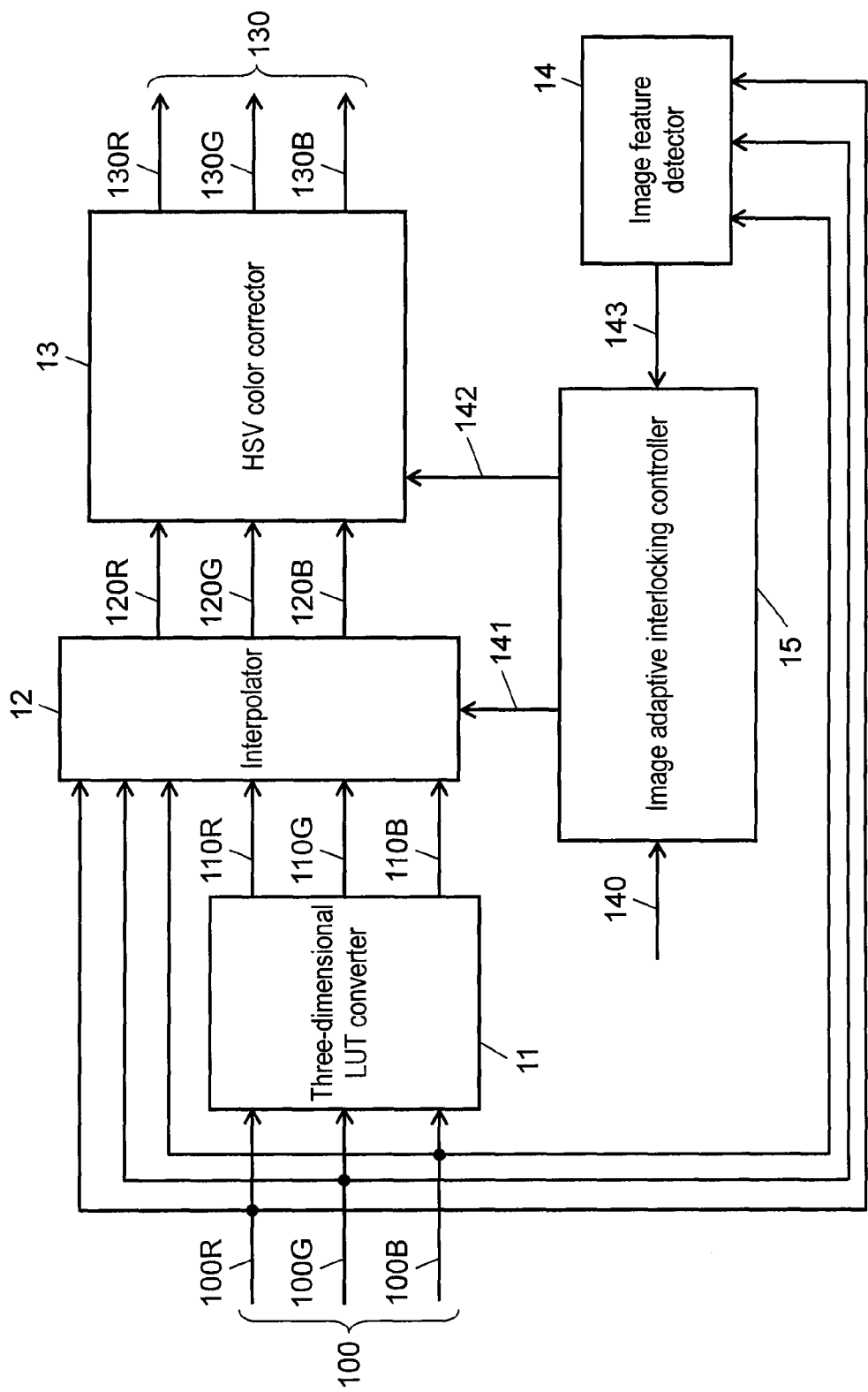
FIG. 1 is an exemplary block diagram showing the configuration of a color management module according to the first exemplary embodiment of the present disclosure.

FIG. 1 is an exemplary block diagram showing a color management module according to the first exemplary embodiment of the present disclosure. The color management module of FIG. 1 includes three-dimensional LUT converter 11 as a first color converter; interpolator 12; HSV color corrector 13 as a second color converter; image feature detector 14; and image adaptive interlocking controller 15. As input image signal 100, input image signal 100 (red signal 100R, green signal 100G, blue signal 100B) in RGB format is input, and as an output signal, image output signal 130 (red signal 130R, green signal 130G, blue signal 130B) in RGB format having undergone a color management process is output.

Herein, an LUT refers to a look-up table. A three-dimensional LUT refers to a three-dimensional look-up table. Three-dimensional LUT converter 11 is an example of a multidimensional look-up table. The first color converter has a multidimensional look-up table. A look-up table refers to a mapping table used for reference or conversion to obtain a calculated value from an input value in a domain. The color management module determines a final output value using this calculated value. Hereinafter a look-up table may be described as an LUT.

Input image signal 100 also contains an image signal of a moving image other than a still image.

Figure 2:
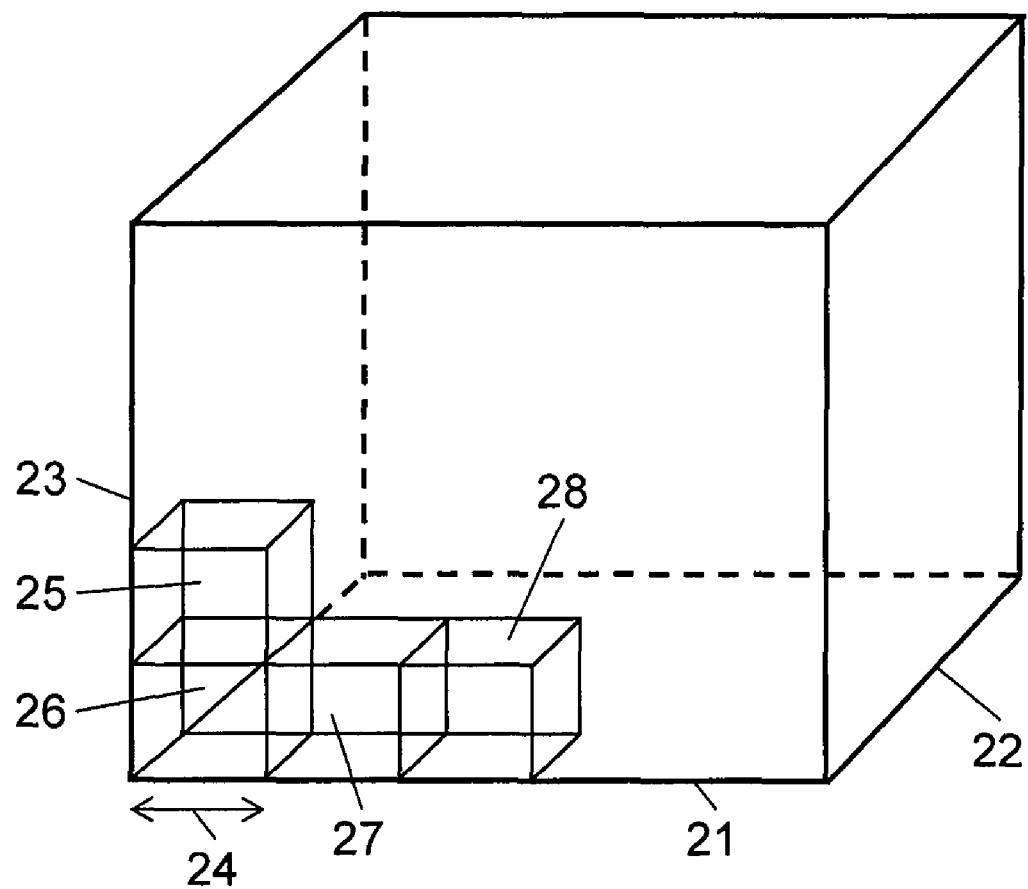
FIG. 2 is a conceptual diagram illustrating the color space and grid points in the three-dimensional LUT converter.
Figure 3:
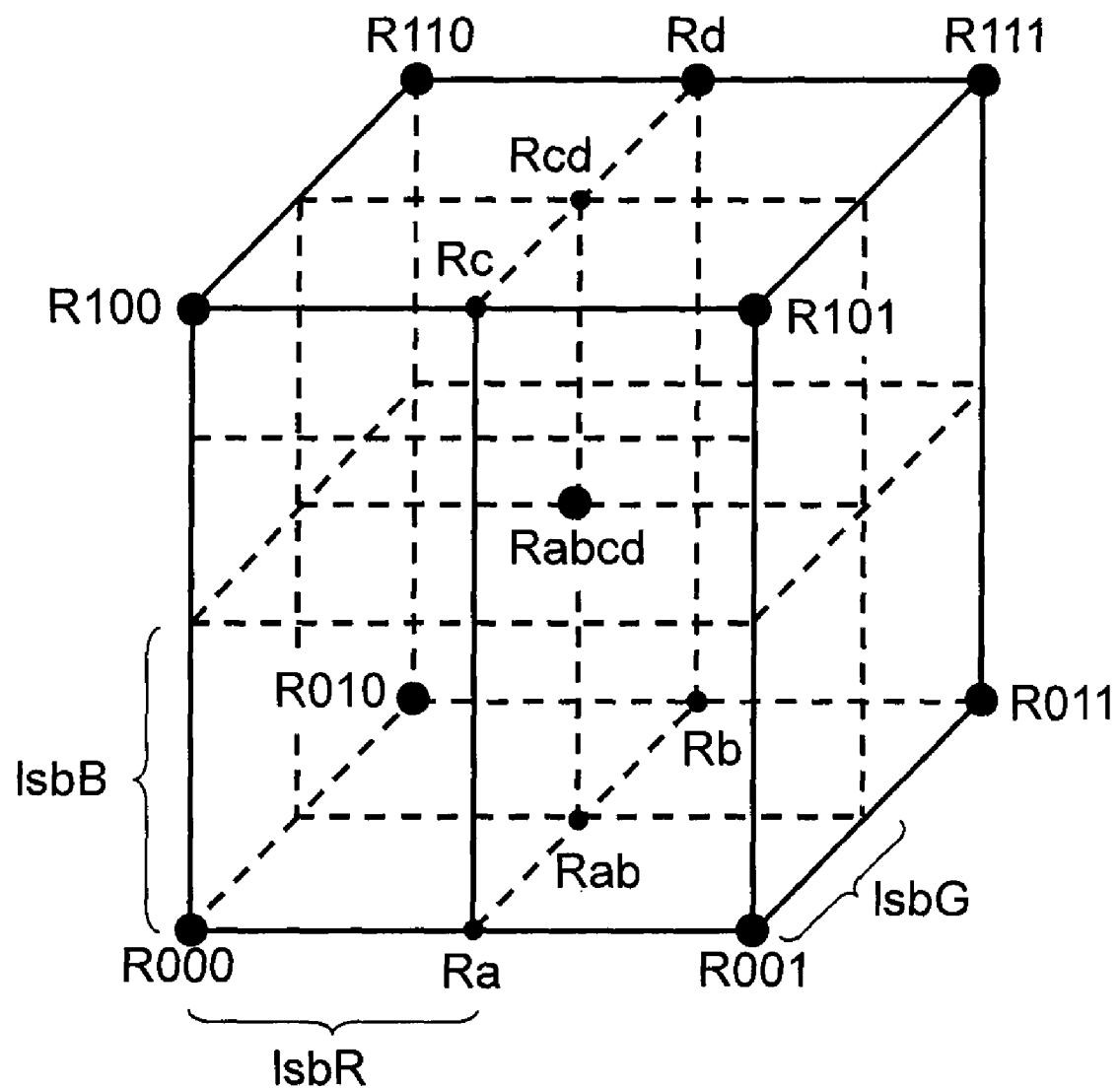
FIG. 3 is a conceptual diagram illustrating three-dimensional interpolation operation in the three-dimensional LUT converter.
Figure 4:
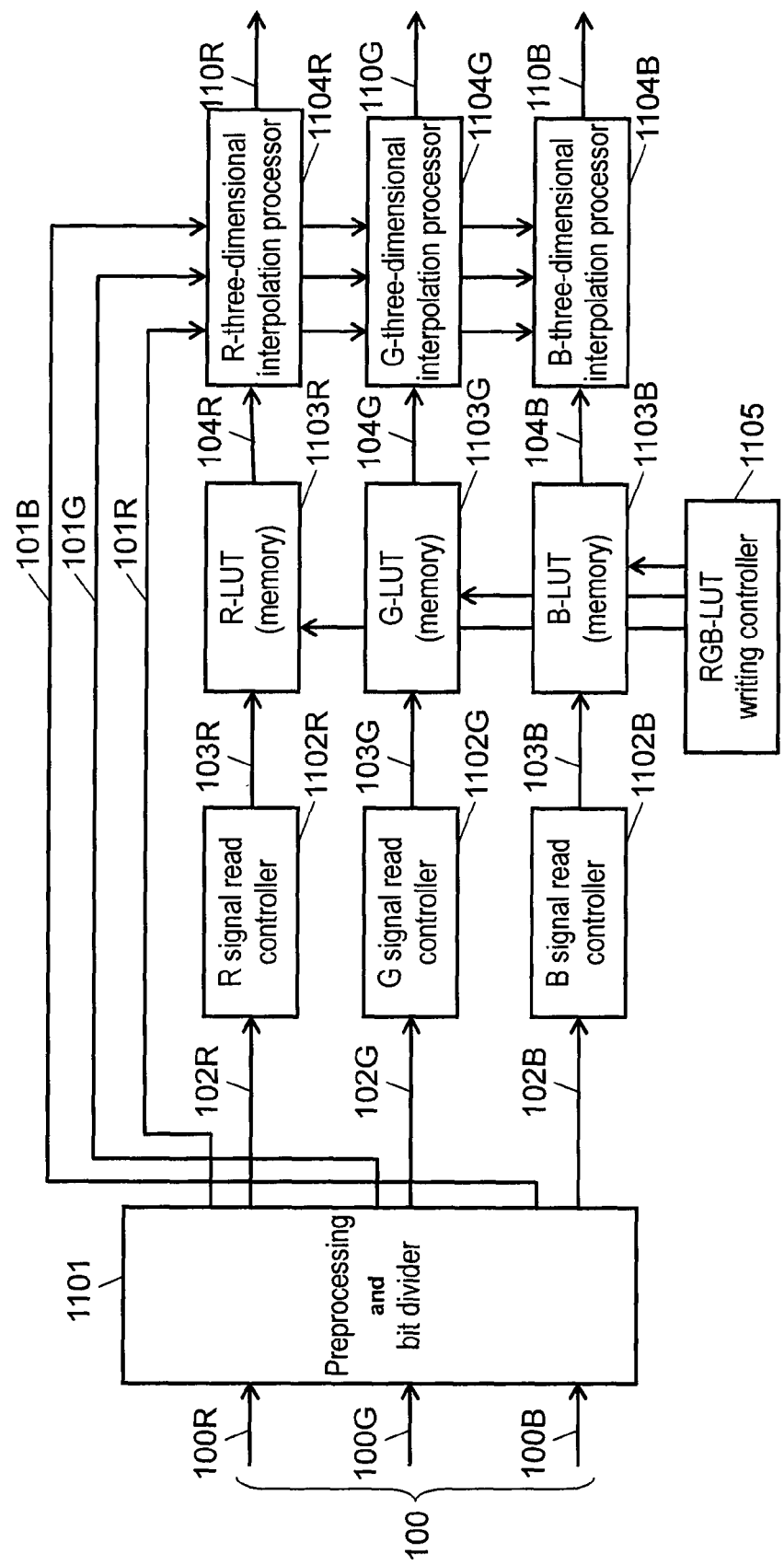
FIG. 4 is an exemplary block diagram showing a configuration of the three-dimensional LUT converter.

First, a description is made of operation of three-dimensional LUT converter 11 using FIGS. 2, 3, 4. FIG. 2 is a conceptual diagram illustrating the color space and grid points in three-dimensional LUT converter 11. Axis 21 indicates a red signal; axis 22 indicates a green signal; and axis 23 indicates a blue signal. Three-dimensional LUT converter 11 defines a predetermined three-dimensional color space as shown, for example, in FIG. 2 for input image signal 100 in RGB format. Then, three-dimensional LUT converter 11 sets converted values (profile data) for RGB respectively, on each grid point of a unit cube produced by equally dividing axes 21, 22, 23 of the color space at given intervals. Each of cubes 25, 26, 27, 28 is an example of a unit cube thus equally divided. Hereinafter, a description is made assuming that equal division is made into X pieces. Arrow 24 represents one unit when division is made into X pieces.

For example, assumption is made of a case where input image signal 100 in RGB format is represented by digital data composed of plural bits. In this case, three-dimensional LUT converter 11 operates so as to select which unit cube is used out of (X to the 3rd power) pieces of unit cubes produced by equally dividing each of axes 21, 22, 23, using the upper bits of input image signal 100, and to calculate a converted value by three-dimensional interpolation (to be described later), using the lower bits.

FIG. 3 is an enlarged view of an example of an R signal in one unit cube in FIG. 2. As shown in FIG. 3, an R signal in one unit cube includes eight grid point data R000 through R111, and lsbR, lsbG, lsbB, which are lower bits of input image signal 100. Three-dimensional LUT converter 11 operates so as to perform interpolation operation (primary, secondary, tertiary in this sequence) from grid point data R000 through R111 and lsbR, lsbG, lsbB, and eventually to calculate the value of Rabcd.

Specifically, in primary interpolation operation for the number of lower bits of 8, the four expressions of mathematical expression type 1 are performed to calculate Ra, Rb, Rc, Rd.

[Mathematical expression type 1]

$$Ra=((R001-R000) \times lsbR)/256+R000$$

$$Rb=((R011-R010) \times lsbR)/256+R010$$

$$Rc=((R101-R100) \times lsbR)/256+R100$$

$$Rd=((R111-R110) \times lsbR)/256+R110$$

Next, for secondary interpolation operation, the expressions of mathematical expression type 2 are performed using the result of the primary interpolation operation to calculate Rab, Rcd.

[Mathematical expression type 2]

$$Rab=((Rb-Ra) \times lsbG)/256+Ra$$

$$Rcd=((Rd-Rc) \times lsbG)/256+Rc$$

Finally, as tertiary interpolation operation, the expressions of mathematical expression type 3 is performed to calculate Rabcd.

[Mathematical expression type 3]

$$Rabcd=((Rcd-Rab) \times lsbB)/256+Rab$$

FIG. 4 shows an example of the basic configuration of three-dimensional LUT converter 11 performing such operation. Three-dimensional LUT converter 11 includes preprocessor and bit divider 1101, R signal read controller 1102R, G signal read controller 1102G, B signal read controller 1102B, R-LUT 1103R, G-LUT 1103G, B-LUT 1103B, R-three-dimensional interpolation processor 1104R, G-three-dimensional interpolation processor 1104G, B-three-dimensional interpolation processor 1104B, and RGB-LUT writing controller 1105. In FIG. 4, a signal, which is the same as that in FIG. 1 is given the same signal name and reference mark. In this example, an image signal of 14 bits in RGB format is input as input image signal 100 (red signal 100R, green signal 100G, blue signal 100B), and preprocessor and bit divider 1101 performs preprocesses such as a limiter, normalization process, and bit division process, to change the signal to 16-bit data. Preprocessor and bit divider 1101 divides the 16-bit data into the upper 5 bits (red signal 102R, green signal 102G, blue signal 102B) and the lower 11 bits (red signal 101R, green signal 101G, blue signal 101B). R signal read controller 1102R, G signal read controller 1102G, and B signal read controller 1102B introduce the upper 5 bits (red signal 102R, green signal 102G, blue signal 102B), respectively. Thus, R signal read controller 1102R determines read address 103R of the corresponding three-dimensional LUT; G signal read controller 1102G determines read address 103G of the corresponding three-dimensional LUT; and B signal read controller 1102B determines read address 103B of the corresponding three-dimensional LUT. R-LUT 1103R receives read address 103R to output data (profile data) 104R corresponding to read address 103R. G-LUT 1103G receives read address 103G to output data (profile data) 104G corresponding to read address 103G. B-LUT 1103B receives read address 103G to output data (profile data) 104G corresponding to read address 103B. Data (profile data) 104R is read into R-three-dimensional interpolation processor 1104R. Data (profile data) 104G is read into G-three-dimensional interpolation processor 1104G. Data (profile data) 104B is read into B-three-dimensional interpolation processor 1104B.

Meanwhile, the lower 11 bits (red signal 101R, green signal 101G, blue signal 101B) are input to R-three-dimensional interpolation processor 1104R, G-three-dimensional interpolation processor 1104G, and B-three-dimensional interpolation processor 1104B, respectively. R-three-dimensional interpolation processor 1104R performs a conversion process by an interpolation process as described above between each grid point data having been read from R-LUT 1103R with red signal 101R as an interpolation coefficient for primary interpolation. G-three-dimensional interpolation processor 1104G performs a conversion process by an interpolation process as described above between each grid point data having been read from G-LUT 1103G with green signal 101G as an interpolation coefficient for secondary interpolation. B-three-dimensional interpolation processor 1104B performs a conversion process by an interpolation process as described above between each grid point data having been read from B-LUT 1103B with blue signal 101B as an interpolation coefficient for tertiary interpolation.

To perform highly accurate color conversion in such a three-dimensional LUT converter 11, equally divided number X (the number by which each axis in FIG. 2 is divided) needs to be large. Then, an enormous amount of profile data is required, generally making it difficult to rewrite (e.g. update, change) an LUT in real time while displaying a moving image. Thus, conventionally, an LUT is usually rewritten while image display is being suspended.

Interpolator 12 performs a weighting process by an interpolation process between input image signal 100 (red signal 100R, green signal 100G, blue signal 100B) and an output signal (red signal 110R, green signal 110G, blue signal 110B) from three-dimensional LUT converter 11, controlled by interpolation control signal 141 from image adaptive interlocking controller 15, for each of RGB. That is, interpolator 12 synthesizes input image signal 100 (red signal 100R, green signal 100G, blue signal 100B) and an output signal (red signal 110R, green signal 110G, blue signal 110B) from three-dimensional LUT converter 11 (i.e. first color converter) in an arbitrary ratio to generate a synthetic image signal. Further, interpolator 12 internally performs a delay process same as that of three-dimensional LUT converter 11 on input image signal 100 to synchronize input image signal 100 (red signal 100R, green signal 100G, blue signal 100B) having bypassed three-dimensional LUT converter 11 with a signal (red signal 110R, green signal 110G, blue signal 110B) from three-dimensional LUT converter 11.

Figure 5:
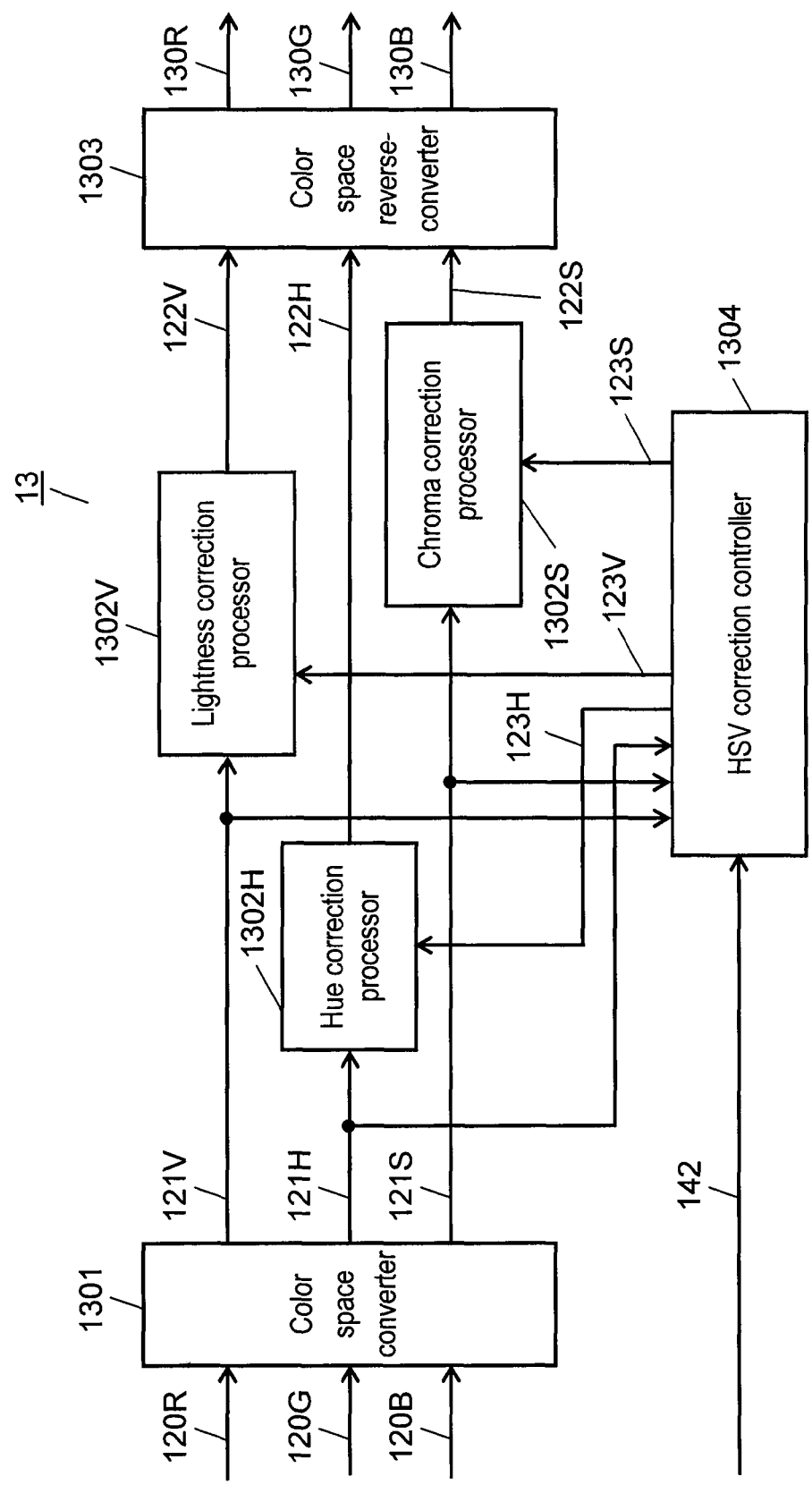
FIG. 5 is an exemplary block diagram showing a configuration of an HSV color corrector.

Next, a description is provided regarding HSV color corrector 13 using FIG. 5. HSV color corrector 13 shown in FIG. 5 is fed with an RGB color signal (red signal 120R, green signal 120G, blue signal 120B), which is a synthetic image signal synthesized by interpolator 12. First, color space converter 1301 converts the color space of an RGB color signal (red signal 120R, green signal 120G, blue signal 120B) having been input. Specifically, a color signal in RGB (red, green, blue) format is converted to each signal component (hue signal 12111, chroma signal 121S, lightness signal 121V) of an HSV color signal in HSV (hue, chroma, lightness) format. This color space conversion is performed with the following expressions shown in mathematical expression type 4 below, for example.

[Mathematical expression type 4]

Lightness signal $V = \text{MAX}(R, G, B)$

Hue signal $H = \{\text{MID}(R, G, B) - \text{MIN}(R, G, B)\} / \{\text{MAX}(R, G, B) - \text{MIN}(R, G, B)\}$ Chroma signal $S = \{\text{MAX}(R, G, B) - \text{MIN}(R, G, B)\} / \text{MAX}(R, G, B)$ Here, MAX (R, G, B) represents a maximum value out of each RGB signal; MID (R, G, B), a median value; MIN (R, G, B), a minimum value.

Simultaneously with this conversion, color space converter 1301 judges to which of RGB respective MAX (R, G, B), MID (R, G, B), and MIN (R, G, B) correspond so that a converted signal is returned by color space reverse-converter 1303.

After an RGB signal is thus converted to an HSV signal (hue signal 121H, chroma signal 121S, lightness signal 121V), lightness correction processor 1302V, chroma correction processor 1302S, and hue correction processor 1302H perform such as correction on lightness signal 121V, chroma signal 121S, and hue signal 121H, respectively.

Here, if lightness correction processor 1302V, chroma correction processor 1302S, and hue correction processor 1302H correct each signal in association with one another as well as independently, correction can be performed by exercising control in association with lightness correction processor 1302V, chroma correction processor 1302S, and hue correction processor 1302H. In this case, HSV correction controller 1304 makes judgement of the above-described association according to input of HSV control signal 142 (to be described later) and to an HSV-series signal from color space converter 1301. Then, HSV correction controller 1304 gives directions to perform an associated correction process through controlling lightness correction processor 1302V, chroma correction processor 1302S, and hue correction processor 1302H by lightness control signal 123V, chroma control signal 123S, and hue control signal 123H, respectively.

Then, color space reverse-converter 1303 returns the corrected HSV signal (hue signal 122H, chroma signal 122S, lightness signal 122V) to a signal (red signal 130R, green signal 130G, blue signal 130B) in RGB format. This operation is the reverse of the conversion operation performed by color space converter 1301 aforementioned.

Image feature detector 14 detects features of input image signal 100. Features of an image signal include the magnitude of changes between successive two screens (frame screen, scene) in image data; signal levels of each color; average, minimum, and maximum values of signal levels of each color; the intensity of signals between a color and another; a luminance level as the entire screen; time-base changes of those mentioned above; and those statistically processed. Image feature detector 14 detects features of input image signal 100 and feeds image adaptive interlocking controller 15 with the image feature signal 143.

Image adaptive interlocking controller 15 outputs interpolation control signal 141 and HSV control signal 142 according to image feature signal 143 input from image feature detector 14 and according to control information 140 input from the outside, to control interpolator 12 and HSV color corrector 13 adaptively. Here, control information 140 includes extraneous factors influencing the conversion characteristics of a color management module, such as metadata representing identification information for an input image signal, a preferred display color pattern desired by a user, the device characteristic of an output device, a surrounding environment where an output device is placed.

In a color management module configured as the above, a description is further made of the entire operation centering on adaptive control of image adaptive interlocking controller 15.

First, three-dimensional LUT converter 11 rewrites an LUT to predetermined profile data such as when changing input image signal 100, according to relationship between the color gamut of image signal 100 being input and the display color gamut of a device (e.g. display device, not shown) connected to the output of the color management module. Three-dimensional LUT converter 11 thus shares a color conversion process including color gamut conversion.

Three-dimensional LUT converter 11 performs a color conversion process on input image signal 100 in xvYCC (an extended standard for YCrCb signals) format, for example, so as to conform to the display color gamut of a display device connected to the output of the color management module. If the display device conforms to BT709 but not to the xvYCC standard supporting a color gamut broader than BT709, the display device fed with an input signal in xvYCC standard does not directly support a color gamut for the entire xvYCC. Consequently, a color of an input signal in some range (extended part) may fail to be correctly clipped, which means the display device cannot support part of an input signal correctly. For this reason, three-dimensional LUT converter 11 performs a process that color-converts the color gamut of an xvYCC signal to that of BT709.

In another example where a display device has a display color gamut broader than BT709, the preprocessing unit in FIG. 4 performs a process such as level conversion so as to adapt to a profile possessed by the subsequent-stage process (three-dimensional LUT process). With this operation, input image signal 100 can perform a color management process using a profile conforming to a color gamut possessed by the display device even for a signal having a region value of 1 or more, or negative by an extended part of xvYCC. Thus, an appropriate image (still image, moving image) can be displayed even when a display device having a color gamut other than BT709 is connected.

On the other hand, HSV color corrector 13 shares a color signal process mainly for image quality adjustment according to settings of the image quality adjustment function of the display device, user's preference, light conditions around the display device, features of an input image, and others. Herein, image quality adjustment refers to, for example, correction of an image quality mode (e.g. image quality bright, sharp, and well-saturated; image quality with a color tone optimum for a film source; image quality not too bright and eye-friendly) and of colors limited to a memory color.

A color signal process performed by HSV color corrector 13 does not require rewriting an LUT with a large amount of data, but can be implemented by only adjusting control parameters by a signal processing circuit, which allows real-time control.

As a result, in a color management module of the present disclosure, three-dimensional LUT converter 11 performs static processes such as a color conversion process (e.g. color gamut conversion); and HSV color corrector 13 performs dynamic processes requiring real time processing. As a result of such arrangement, image quality adjustment supporting real-time requests is possible, implementing a color signal process with a higher degree of accuracy.

Further, the following adjustment is also made possible. That is, after three-dimensional LUT converter 11 performs a color management process (described as a CMS process, hereinafter) such as color conversion and color correction, interpolator 12 adjusts the interpolation coefficients of input image signal 100, and of an RGB signal (red signal 110R, green signal 110G, blue signal 110B), which is output from three-dimensional LUT converter 11, to arbitrarily adjust the effect of a CMS process by three-dimensional LUT conversion.

Meanwhile, adjustment of the interpolation coefficient of interpolator 12 can be changed dynamically according to interpolation control signal 141 determined by image adaptive interlocking controller 15 on the basis of extraneous control information 140 and image feature signal 143. In this case, color conversion with a higher degree of accuracy is made possible according to features of an image and extraneous control information.

For example, when input image signal 100 conforms to xvYCC standard, interpolator 12 outputs a signal having undergone a CMS process appropriate to the display device by three-dimensional LUT converter 11, to subsequent-stage HSV color corrector 13. Meanwhile, when the display color gamut of the display device supports only BT709 and the input image signal conforms to BT709 standard, an input image signal that has bypassed the three-dimensional LUT converter can be directly output to the subsequent stage.

Further, interpolator 12 can be controlled in conjunction with HSV color corrector 13 subsequently positioned. In this case, when image adaptive interlocking controller 15 exercises control associating interpolation control signal 141 to be output to interpolator 12 with HSV control signal 142 to be output to HSV color corrector 13, color conversion can be performed with a higher degree of accuracy.

As described above, image adaptive interlocking controller 15 exercises interlocking control for preferable color conversion according to image features and to extraneous control signal 140. Hereinafter, a further description is made of a control example of image adaptive interlocking controller 15.

Figure 6:
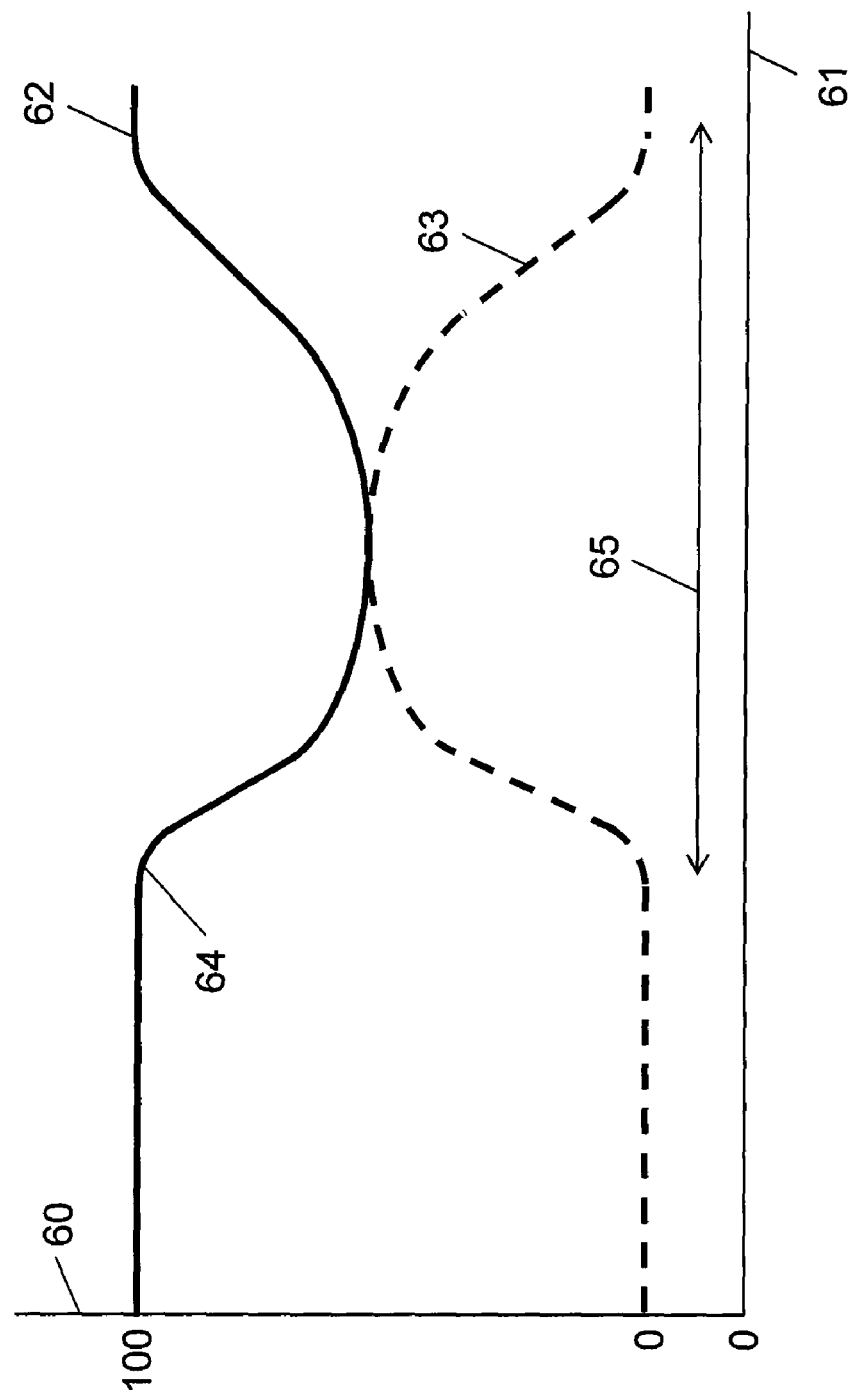
FIG. 6 shows an example of an interpolation control method in a case where an image scene has substantially changed.

First, a description is made of a case where a CMS process performed by three-dimensional LUT converter 11 and adaptive control is exercised on HSV color corrector 13, in consideration of image-related features of an image signal to be input. FIG. 6 shows an example interpolation control method in a case where an image scene has changed significantly. In FIG. 6, horizontal axis 61 represents time; vertical axis 60 represents interpolation coefficient (the unit is %). Solid line 62 indicates the line of CMS and HSV processes; dotted line 63 indicates the line of a bypass and HSV process. For example, assumption is made of a case where image feature detector 14 detects that an image scene has changed substantially from features of the previous image. In this case, with interpolation control 141 on interpolator 12, the interpolation coefficient is controlled after scene change 64 as shown in FIG. 6, for example, to temporarily weaken the degree of influence of a CMS process by three-dimensional LUT converter 11 (the ratio of signals from three-dimensional LUT converter 11 is reduced). Here, period 65 is a scene change adjusting period. This arrangement prevents a CMS process from substantially influencing the appearance when color correction by the CMS process is biased and the scene changes to an image largely influenced by the bias, thereby reducing the discrepancy (and associated uncomfortable viewing feeling) when the scene changes.

In more detail, image feature detector 14 detects not only scene changes but the signal level and occurrence frequency of each RGB color component. Then, the degree of influence is judged for profile data actually set currently in three-dimensional LUT conversion. Actually, when a profile strongly biased for a specific color component, the degree of influence by the process effect can be judged by such a method. Consequently, when the scene changes to an image with substantial changes, the degree of reducing the influence by a CMS process is to be enhanced (weakens more largely), and vice versa as shown in FIG. 6.

Specifically, image feature detector 14 detects at least one of the signal level and occurrence frequency in color information of input image signal 100. Then, image adaptive interlocking controller 15 controls interpolator 12 when at least one of the signal level and occurrence frequency is within a given range. Thus, the synthesis ratio of input image signal 100 converted by three-dimensional LUT converter 11 (i.e. first color converter) is reduced.

Next, a description is made of a case where the control state is changed according to control information 140 input to image adaptive interlocking controller 15. As an example, arrangement can be made that a sensor (not shown) detects illuminance level information around a display device connected to the output of a color management module of the present disclosure, as control information 140. As a result, an interpolation coefficient and control details of the HSV color correction process can be adaptively controlled according to the illuminance level. For example, when the illuminance level decreases and it gets dark, control is exercised so that the interpolation coefficient is decreased to weaken the CMS effect for a profile controlling the color to be dark and dull in the CMS process by three-dimensional LUT converter 11. Simultaneously, control is exercised so that the color lightness and chroma are emphasized as required in the HSV color correction process. As such, the viewability of the display device and discrimination of color difference can be increased by a color management process on input image signal 100 with a higher degree of accuracy.

Further, in an environment where a significantly low illuminance level continues, hue control in the HSV color correction process as well can be performed so as to enhance a B signal and to suppress an R signal out of the RGB color components in order to compensate for the Purkinje phenomenon, which is a visual characteristic of the human eye in scotopic vision. That is, image adaptive interlocking controller 15 exercises control to enhance blue signal 100B (a blue component of input image signal 100) and to weaken red signal 100R (a red component of input image signal 100) at an illuminance level within a given range, thereby implementing a color management process with a higher quality.

Conversely, at a high illuminance level, to achieve an effect even under a bright condition, control can be exercised so that the interpolation coefficient is increased to enhance the CMS process effect, and color lightness and chroma are emphasized in an HSV color correction process.

An interpolation coefficient and control details of the HSV color correction process can be adaptively controlled according to light information other than illuminance level information. For example, control is exercised in consideration that the color displayed by the display device is influenced by the color of light (e.g. illuminating color) around the display device, detected by a sensor. This operation enables a color management process in further consideration of a state where a user actually views. Further, a color management process can be performed similarly using color temperature of light. Thus control information 140 may include information on external light.

The interpolation control as described above operates to interpolate by weighting between the result of the CMS process by three-dimensional LUT converter 11 and an unprocessed signal, and thus can be used as well for adjusting the strength of a process effect. A color management module of the present disclosure in a TV set can be used as a simple strength adjusting function for a CMS process by three-dimensional LUT converter 11 by making the interpolation coefficient adjustable by the user.

As described hereinbefore, a configuration in which adaptive control is exercised in conjunction with an interpolation coefficient of interpolator 12 between a CMS process by three-dimensional LUT converter 11 and a system in which the process is bypassed; and a color signal processing parameter in its subsequent HSV color corrector 13 enables seamless control in real time with adjustment of the effect of a CMS process by a three-dimensional LUT linked to adjustment of color image quality.

In addition, when a color conversion process is performed in the order described; a CMS process by three-dimensional LUT converter 11 shares a color gamut conversion process; and HSV color corrector 13 shares an image quality adjustment process, color gamut conversion and image quality adjustment can be implemented effectively and easily for an xvYCC signal as well.

In the first exemplary embodiment, the description is made of a case where an image signal between three-dimensional LUT converter 11, interpolator 12, and HSV color corrector 13 is in RGB format, but the present disclosure is not limited to this case. For example, if the process is performed in the color space of hue, chroma, and lightness (HSV) in all the steps, it is possible to process a signal in the HSV color space as well.

Second Exemplary Embodiment

Figure 7:
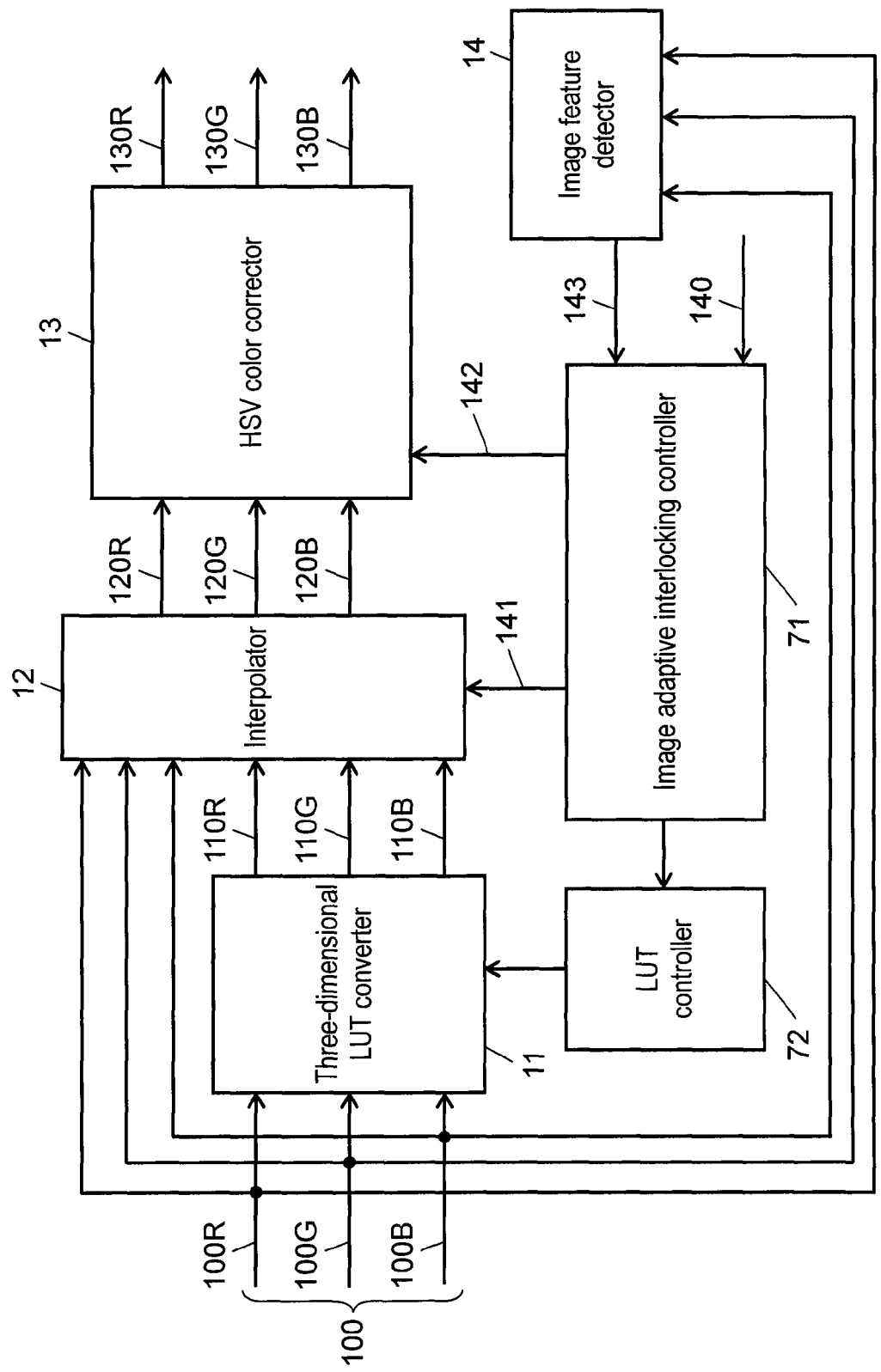
FIG. 7 is an exemplary block diagram showing the configuration of a color management module according to the second exemplary embodiment of the present disclosure.

FIG. 7 is an exemplary block diagram showing the configuration of a color management module according to the second exemplary embodiment of the present disclosure. The color management module shown in FIG. 7 is different from that in FIG. 1 in that LUT controller 72 is added in FIG. 7 and that internal operation of image adaptive interlocking controller 71 has been changed. Hereinafter, a description is made centering on LUT controller 72 and image adaptive interlocking controller 71. The other components are the same as the color management module shown in FIG. 1, and thus the same component is given the same reference mark and its detailed description is omitted.

LUT controller 72 controls rewriting LUT data of three-dimensional LUT converter 11. An LUT of three-dimensional LUT converter 11 is to have {(X+1) to the 3rd power} pieces of data at a grid point per each color, where each axis of the color space is equally divided into X pieces as shown in FIG. 2. These data exist for each RGB, and thus the amount of LUT data is to be three times {(X+1) to the 3rd power} pieces.

For example, although depending on the configuration of a color management module, three-dimensional LUT converter 11 may arrange the space of a RAM for each of eight space units (eight vertices of a cube) for each color. LUT controller 72 exercises memory control so that a total of 24 pieces of memory spaces become given grid point data to control writing to the RAM.

In the second embodiment, operation is performed in the following manner when rewriting LUT data of three-dimensional LUT converter 11. That is, interpolator 12 switches between input image signal 100 and a signal output from three-dimensional LUT converter 11 according to a given time constant. Input image signal 100 in this case is a signal transmitted through a bypass (not through three-dimensional LUT converter 11). First, after interpolator 12 is controlled so as to select 100% of signals that have passed through the bypass, three-dimensional LUT converter 11 rewrites LUT data by LUT controller 72. After that, a return process is performed so that interpolator 12 selects 100% of CMS process signals. Thus, the visual discrepancy can be reduced (i.e., easing uncomfortable viewing feeling), the LUT can be rewritten without stopping image display.

Figure 8:
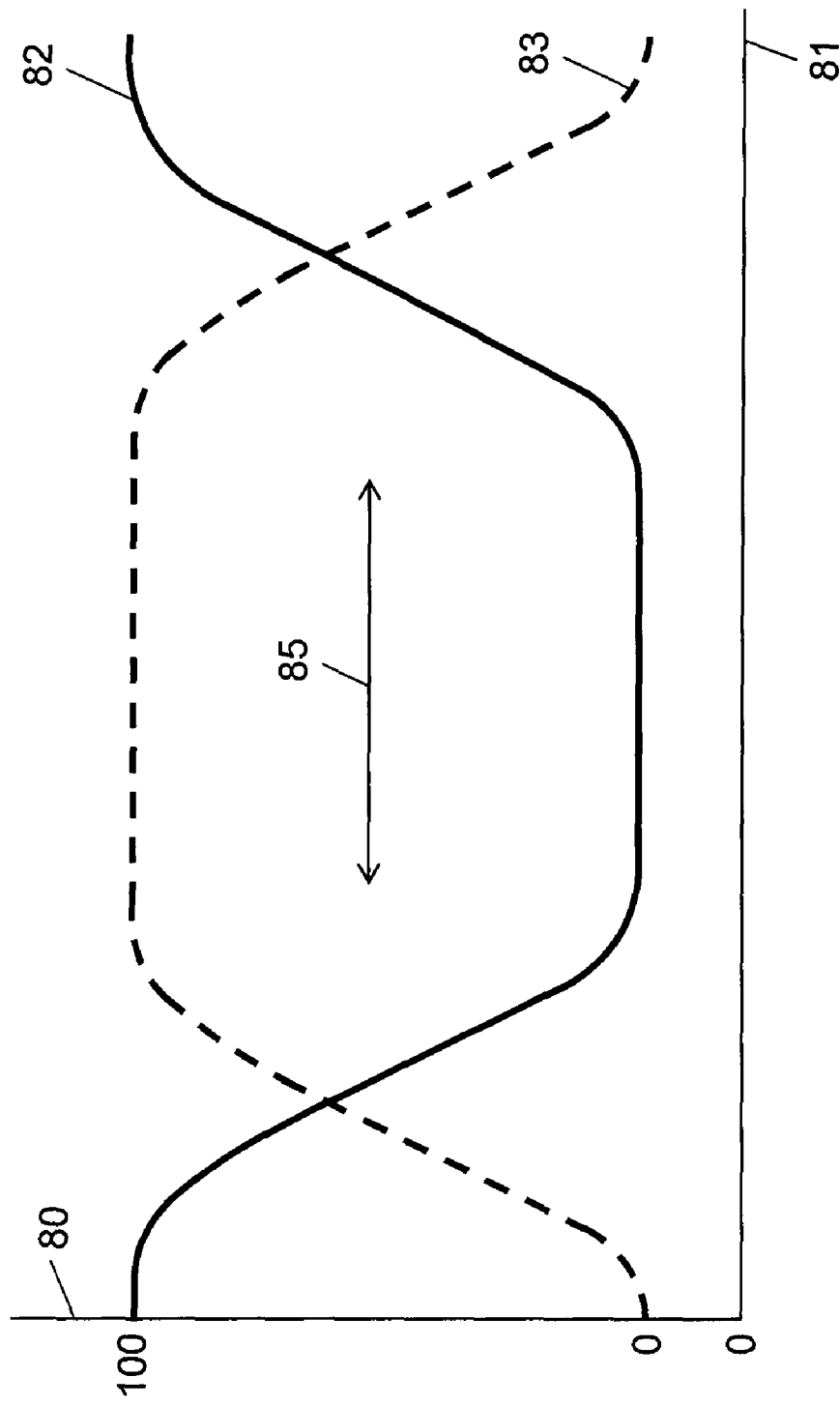
FIG. 8 illustrates an example of an interpolation control method when rewriting an LUT.

A description is provided of interlocking control operation by image adaptive interlocking controller 71 using FIG. 8. For example, an assumption is made of a case where data of the illuminance level in control information 140 externally input has substantially changed during image display. In this case, the LUT data of three-dimensional LUT converter 11 is desirably rewritten to perform color conversion suitable for illuminance level. However, because of the LUT data of a relatively large amount as described in the first embodiment, rewriting LUT data during operation can cause interruption, delay, and dropout in an output signal, or disturbance in a image signal to be output.

FIG. 8 shows an example of a method of interpolation control when rewriting an LUT. In FIG. 8, vertical axis 80 represents an interpolation coefficient (the unit is %); horizontal axis 81 represents time. Interpolation coefficient k can be said to indicate the ratio of a CMS process. Solid line 82 indicates the line of CMS and regular processes; dotted line 83 indicates the line of bypass and alternative correction processes (an alternative correction process is described later). Solid line 82 indicating the line of CMS and regular processes changes from a state where the degree of influences of an output signal from three-dimensional LUT converter 11 is 100 (interpolation coefficient k is 100) to 0 (interpolation coefficient k has been controlled). At this moment, dotted line 83 indicating bypass and alternative correction processes conversely becomes 100 since the interpolation coefficient is (100-k). The period during which this state continues is LUT rewrite period 85. During LUT rewrite period 85, LUT controller 72 rewrites LUT data. When LUT rewriting is completed, the weight of an output signal from three-dimensional LUT converter 11 is returned to 100 by the reverse operation. As a result of this operation, LUT data can be rewritten without stopping image display.

In the example of FIG. 8, controlling interpolation coefficient k from 100 to 0 is nearly the same manner as that from 0 to 100, but not limited to this manner. For example, the change rate of interpolation coefficient k from 0 to 100 may be more gentle than that from 100 to 0, or the change rate of interpolation coefficient k may be changed according to a type of features detected by image feature detector 14. Further, interpolation coefficient k is not necessarily set to 0 or 100, but it can be changed between intermediate values (e.g. from 100 to 50).

Here, LUT controller 72 does not need to control rewriting all the LUT data (grid point data), but it may control rewriting only an arbitrary part of the LUT data. In this case, LUT controller 72 works by rewriting only part of the LUT data, which makes LUT data rewrite time relatively shorter, enabling a CMS process to be changed more rapidly. Here, part of the LUT data may be fixed or changed as required. To change part of the LUT data to be rewritten as required, an optimum rewritten part (a part required to be changed) is specified according to a control signal fed from image adaptive interlocking controller 71 to LUT controller 72, and then LUT controller 72 operates to rewrite the data.

While LUT data is being rewritten, a process by HSV color corrector 13 can be also changed. While LUT controller 72 is rewriting (updating) LUT data, HSV color corrector 13 processes an input signal not having undergone a CMS process, namely input image signal 100 itself. Thus in HSV color corrector 13, in addition to a correction process (hereinafter, described as a regular correction process) executed in a regular CMS process by three-dimensional LUT converter 11, an alternative correction process is added. An alternative correction process is a conversion process in the hue, chroma, and lightness spaces for approximating a CMS process at an intermediate time between before and after the three-dimensional LUT is changed.

Consequently, color conversion with a higher degree of accuracy is made possible even while LUT data is being updated.

Further, highly accurate color conversion can be performed more smoothly by stepwise adding alternative correction processes to HSV color corrector 13 and simultaneously by changing the ratio of synthesizing an image signal from three-dimensional LUT converter 11 (first color converter) to an image signal to be input (weakening the ratio of signals from the three-dimensional LUT) in interpolator 12. In this case, a decision is made in consideration of the time period during which the interpolation coefficient (synthesis ratio) is changed in interpolator 12. The time period in this case can be changed according to image features (e.g. the frame rate of an image, a signal for image content).

Third Exemplary Embodiment

Figure 9:
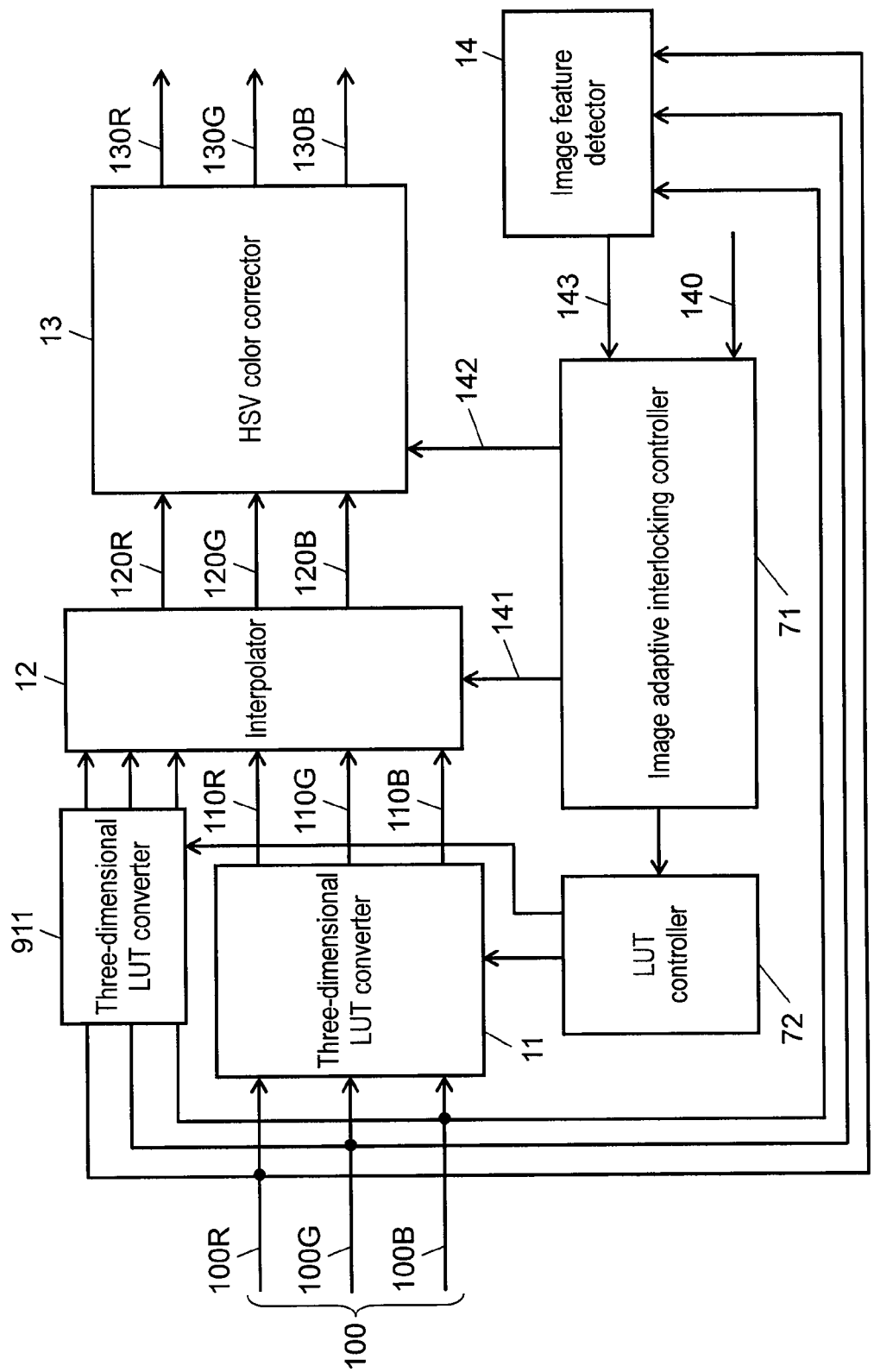
FIG. 9 is an exemplary block diagram showing the configuration of a color management module according to the third exemplary embodiment.

FIG. 9 is a block diagram showing the configuration of a color management module according to the third exemplary embodiment. The third embodiment differs from the second in that three-dimensional LUT converter 911 is newly added, and that LUT controller 72 controls not only an LUT of three-dimensional LUT converter 11 but an LUT of three-dimensional LUT converter 911. Here, three-dimensional LUT converter 911 is an example of a third color converter.

Input image signal 100 is input to three-dimensional LUT converters 11 and 911. They execute color conversion processes set according to an LUT, respectively. An image signal processed by the converters is output to interpolator 12. Interpolator 12 synthesizes two color signals fed according to control manners determined by image adaptive interlocking controller 71 in an arbitrary ratio, on the basis of extraneous control signal 140 and image feature signal 143 from image feature detector 14, in the same way as in the first and second embodiments.

Figure 10:
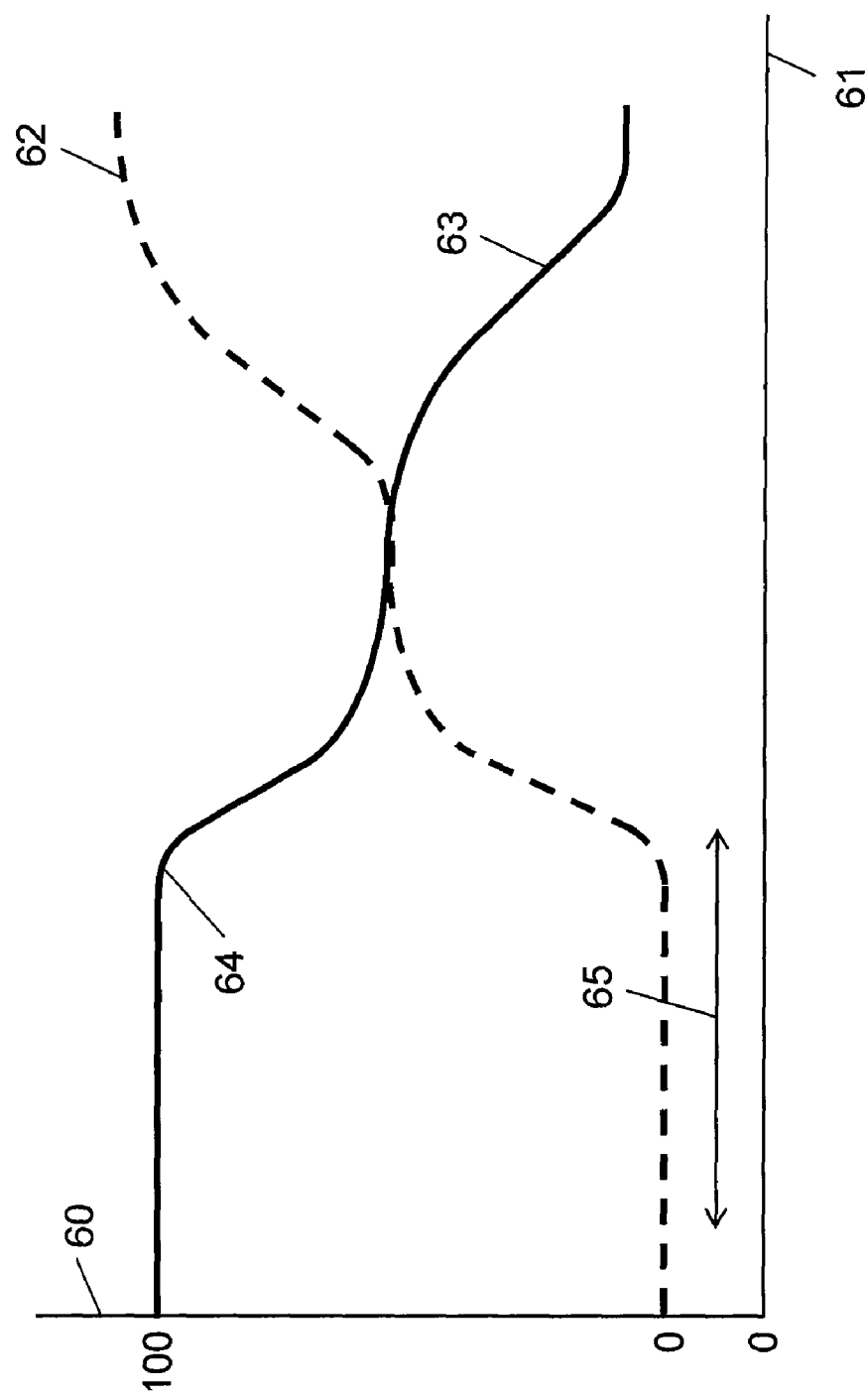
FIG. 10 shows an example of the interpolation method by an interpolator according to the third embodiment.

An example of an interpolation method by interpolator 12 is shown in FIG. 10. In FIG. 10, the vertical axis represents the interpolation coefficient (the unit is %); the horizontal axis represents time. The interpolation method of FIG. 10 starts at a state where color signals from three-dimensional LUT converter 11 are 100% selected by interpolator 12. When image adaptive interlocking controller 71 determines that process manners of a color conversion process are changed on the basis of control signal 140 or image feature signal 143, image adaptive interlocking controller 71 directs LUT controller 72 to change LUT data. When LUT controller 72 receives directions of changing LUT data, LUT controller 72 performs the process of changing LUT data of three-dimensional LUT converter 911. At this moment, interpolator 12 is in a state interpolating 100% of color signals from three-dimensional LUT converter 11, and color signals from three-dimensional LUT converter 911 have not influenced color signal 120 output from interpolator 12. Consequently, even if LUT controller 72 changes LUT data of three-dimensional LUT converter 911, color signal 120 is not adversely affected.

When LUT controller 72 rewrites LUT data of three-dimensional LUT converter 911, image adaptive interlocking controller 71 outputs interpolation control signal 141 for changing the coefficient to interpolator 12. Interpolator 12 changes the interpolation coefficient according to interpolation control signal 141. When interpolator 12 starts to change the interpolation coefficient, the ratio of color signals output from three-dimensional LUT converter 11 decreases as shown in FIG. 10, and the ratio of color signals output from three-dimensional LUT converter 911 increases with time. As a result, the interpolation coefficient of color signals from three-dimensional LUT converter 911 eventually reaches 100%.

In the third embodiment, every color signal input to interpolator 12 undergoes a color conversion process by three-dimensional LUT converter 11 or three-dimensional LUT converter 911. Hence, a color conversion process with a higher degree of accuracy can be maintained even during the period while adaptive image interlocking controller 71 is changing a color conversion process.

Further, an interpolation coefficient can be changed after one three-dimensional LUT converter changes LUT data preliminarily, and thus the time required for changing a color conversion process influencing color signals can be shortened.

Here, the above description is made of a case where the interpolation coefficient is changed according to color signals from three-dimensional LUT converter 11 and three-dimensional LUT converter 911 at 100% and 0%, but it is not limited to this case. For example, on one hand, a given color conversion process is always performed as a basic color conversion process; on the other hand, a color conversion process may be performed for the difference. In this case, interpolator 12 has only to change the degree of influence by the color conversion process for the difference according to interpolation control signal 141.

Meanwhile, the data amount (the degree to which the grid-shaped data in FIG. 2 is equally divided) used in three-dimensional LUT converter 11 is not necessarily the same as that in three-dimensional LUT converter 911. On one hand, the entire color space is equally color-divided and a color conversion process is performed according to an LUT; on the other hand, LUT data may be used that sets a specific region (e.g. a region close to a skin color) more precisely. In this case, when image feature detector 14 detects a color signal showing human skin, image adaptive interlocking controller 71 may make interpolator 12 increase its interpolation coefficient relatively to perform a color conversion process for skin-color region more accurately. In this case, a color conversion process with a higher degree of accuracy is made possible for a specific color region.

As first color conversion shown in the embodiments first through third, a method other than that by three-dimensional LUT converter 11 is possible. For example, if the operations of a CMS process are easily mathematized such as in a nonlinear function, the amount of memory can be made smaller than by an LUT, which further simplifies changing the operations of a conversion process.

In the embodiments first through third, three-dimensional LUT converter 11 is shown as a first color converter, but it is not limited to a three-dimensional LUT. Another LUT converter can implement the present disclosure in the same way. For example, an input signal is once converted to a color space in the HSV system, and a two-dimensional LUT converter can be used for arbitrary two variables (e.g. hue and chroma, hue and illuminance level, chroma and illuminance level). In this case, more real-time-oriented color management is possible by the first and second color converters sharing parts for performing dynamic and static color conversions with each other.

In the first through third embodiments, a signal in RGB format is used as the format of input image signal 100 and output image signal 130 for the description, but the present disclosure is not limited to this case. The present disclosure is feasible with a color signal other than that in RGB format.

Fourth Exemplary Embodiment

In the first through third embodiments, a color management module is used for the description, but a method other than that of a module is possible to implement the present disclosure. For example, the present disclosure is feasible with an integrated circuit or apparatus as hardware by implementing each processor shown in FIGS. 1, 7, 9, and others with an electronic circuit in a function unit.

In the same way, the present disclosure is feasible with a software program running on hardware including a CPU or DSP (digital signal processor), with memory and others, by implementing each processor shown in FIGS. 1, 7, 9 with a software function unit (e.g. processing function).

Further, the present disclosure is also feasible with part of a display unit by providing a display device such as a liquid crystal display, plasma display, EL display, and LED display at the output side of the first to third embodiments. In this case, more appropriate display is made possible by performing a color management process according to the characteristics of a display device connected in the first or second color converter.

Figure 11:
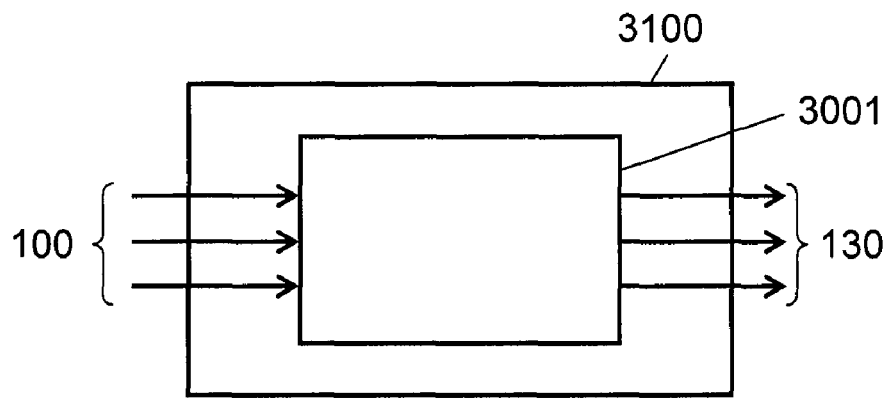
FIG. 11 shows a color management apparatus according to the fourth embodiment of the present disclosure.
Figure 12:
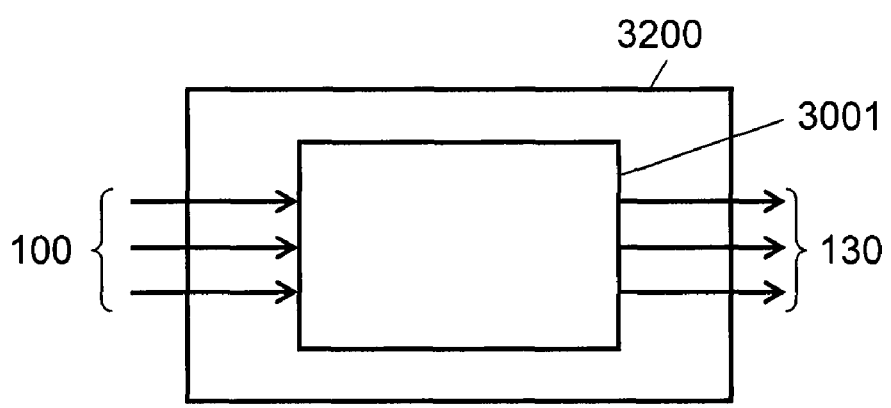
FIG. 12 shows an integrated circuit according to the fourth embodiment of the present disclosure.
Figure 13:
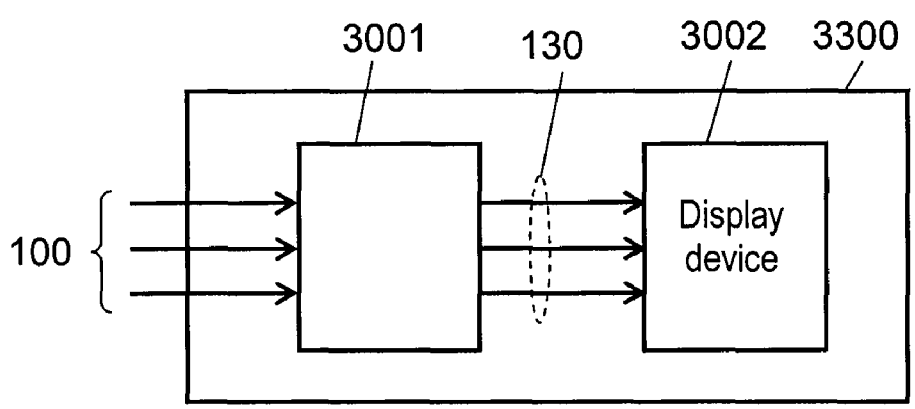
FIG. 13 shows a display unit according to the fourth embodiment of the present disclosure.
Figure 14:
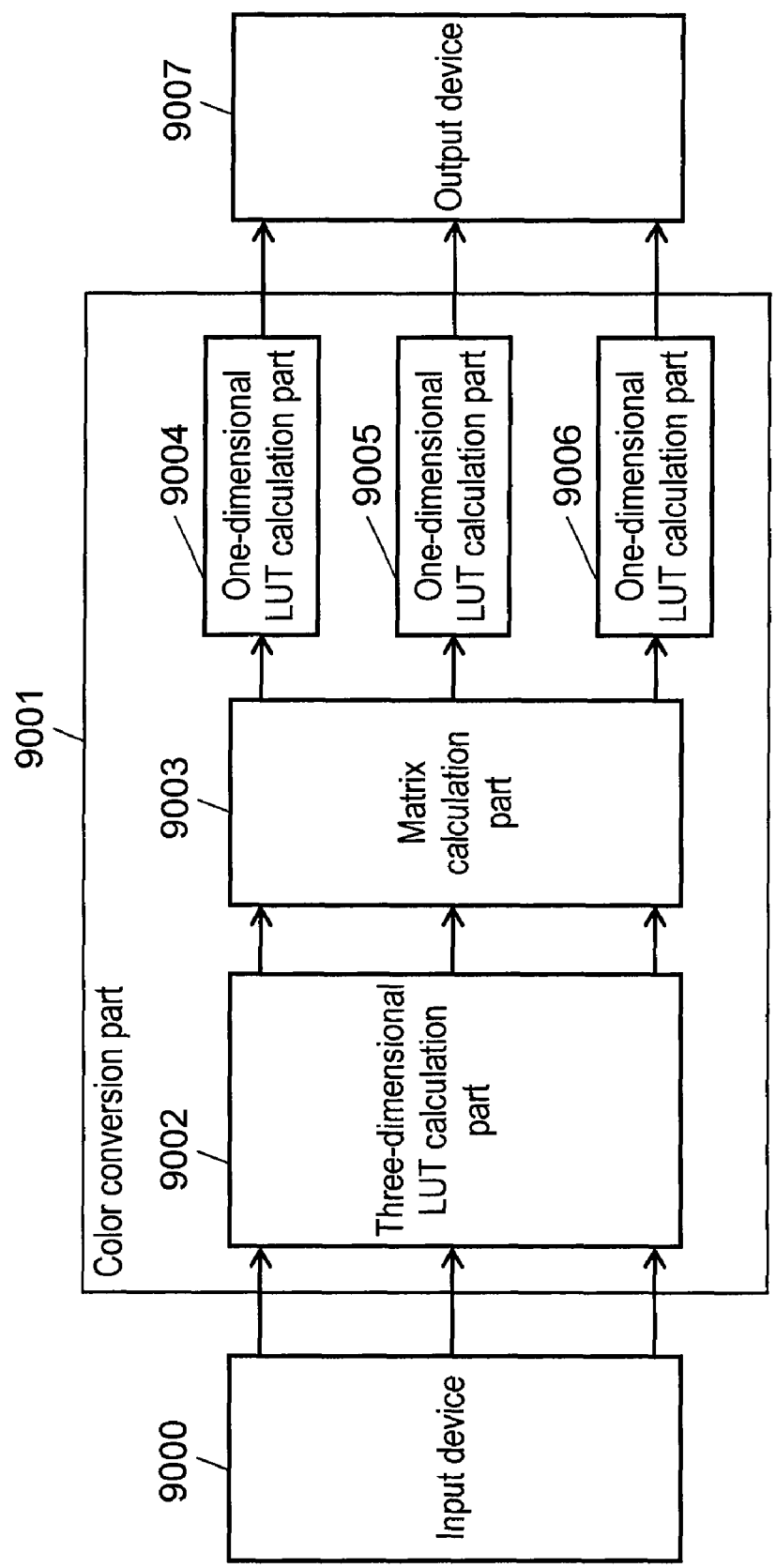
FIG. 14 is a block diagram showing the outline structure of a conventional example.
Figure 15:
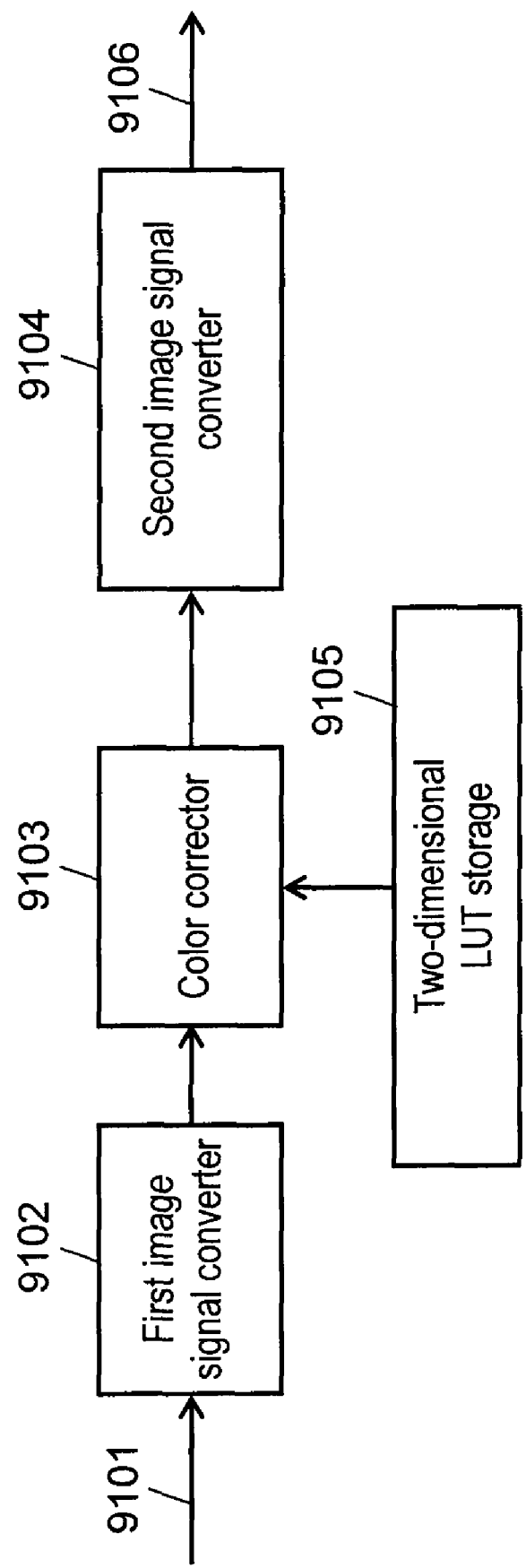
FIG. 15 is a block diagram showing the outline structure of another conventional example.

Thus in the fourth embodiment, a description is made of a color management apparatus, integrated circuit, and display unit according to the present disclosure using FIGS. 11 through 13. FIG. 11 shows a color management apparatus of the present disclosure; FIG. 12, an integrated circuit; FIG. 13, a display unit.

First, a color management apparatus of the present disclosure is described with FIG. 11. In FIG. 11, color management apparatus 3100 includes color management module 3001. Color management module 3001 is the same as those shown in the first through third embodiments. Input image signal 100 and output image signal 130 are the same as those shown in the first through third embodiments, respectively.

Next, an integrated circuit of the present disclosure is described with FIG. 12. In FIG. 12, integrated circuit 3200 includes color management module 3001. Color management module 3001 is the same as those shown in the first through third embodiments. Input image signal 100 and output image signal 130 are the same as those shown in the first through third embodiments, respectively.

Further, a display unit of the present invention is described with FIG. 13. In FIG. 13, display unit 3300 includes color management module 3001 and display device 3002. Color management module 3001 is the same as those shown in the first through third embodiments. Input image signal 100 and output image signal 130 are the same as those shown in the first through third embodiments, respectively. Output image signal 130 output from color management module 3001 is fed to display device 3002, which performs image display and other operation. Display device 3002 is a display device such as a liquid crystal display, plasma display, EL display, or LED display.

The present disclosure is implemented not only with a color management apparatus, integrated circuit, display unit, and other devices, but as a module in a function unit composing part of the apparatus and integrated circuit. The present disclosure is also implementable as a software process.

According to the present disclosure, a color process with a higher degree of accuracy is made possible particularly by changing the manners of a color management process for an input image signal in real time.

Industrial Applicability

A color management module, color management apparatus, integrated circuit, display unit, method of color management, and its process method according to the present disclosure are useful when applied to a multidimensional color management process that exercises control of a color correction process adaptively in real time particularly according to image-related features of an input image signal, in a color management apparatus by a multidimensional LUT performing a color correction process for an image display unit such as a TV set.

The invention claimed is:

1. A color management module comprising:
   a first color converter converting color information contained in an input image signal;
   an interpolator outputting a synthetic image signal utilizing an output from at least one of the first color converter and the input image signal;
   a second color converter converting color information contained in the synthetic image signal and outputting an image signal;
   an image feature detector detecting a feature of the input image signal; and
   an image adaptive interlocking controller controlling at least one of the interpolator and the second color converter according to the feature.

2. The color management module of claim 1, wherein the first color converter includes a multidimensional look-up table.

3. The color management module of claim 2, wherein the second color converter converts color in a color space comprising hue, chroma, and lightness.

4. The color management module of claim 2, further comprising:
   a look-up table controller for changing data in the multidimensional look-up table.

5. The color management module of claim 1, wherein the image adaptive interlocking controller receives extraneous control information, and controls at least one of the interpolator and the second color converter according to the extraneous control information and the feature.

6. The color management module of claim 5, wherein the image adaptive interlocking controller determines a ratio of synthesizing an image signal in the interpolator according to the extraneous control information.

7. The color management module of claim 5,
   wherein the extraneous control information includes information on external light; and
   wherein the information on the external light is an illuminance level.

8. The color management module of claim 1,
wherein the image feature detector detects a magnitude of a change of the input image signal between successive screens, and
wherein the image adaptive interlocking controller controls the interpolator to weaken a ratio of synthesizing an image signal converted by the first color converter when the magnitude of a change is within a given range.

9. The color management module of claim 1,
wherein the image feature detector detects at least one of a signal level and occurrence frequency, in color information of the input image signal, and
wherein the image adaptive interlocking controller controls the interpolator to weaken a ratio of synthesizing an image signal converted by the first color converter when at least one of the signal level and the occurrence frequency is within a given range.

10. The color management module of claim 4, wherein the look-up table controller changes part of data in the multidimensional look-up table.

11. A color management module comprising:
a first color converter converting color information contained in an input image signal by using a first multidimensional look-up table;
a second color converter converting color information contained in the input image signal by using a second multidimensional look-up table;
an interpolator generating a synthetic image signal utilizing at least one of image signals output from the first color converter and image signals output from the second color converter; and
a third color converter converting the color information contained in the synthetic image signal and outputting the color information.

12. A color management apparatus comprising a color management module,
the color management module comprising:
a first color converter converting color information contained in an input image signal;
an interpolator generating a synthetic image signal utilizing at least one of an output from the first color converter and the input image signal;
a second color converter converting color information contained in the synthetic image signal and outputting the color information;
an image feature detector detecting a feature of the input image signal; and
an image adaptive interlocking controller controlling at least one of the interpolator and the second color converter according to the feature.

13. An integrated circuit comprising a color management module,
the color management module comprising:
a first color converter converting color information contained in an input image signal;
an interpolator generating a synthetic image signal utilizing at least one of an output from the first color converter and the input image signal;
a second color converter converting color information contained in the synthetic image signal and outputting the color information;
an image feature detector detecting a feature of the input image signal; and
an image adaptive interlocking controller controlling at least one of the interpolator and the second color converter according to the feature.

14. A display unit comprising:
a color management module; and
a display device displaying an image signal from a second color converter,
wherein the color management module comprises:
a first color converter converting color information contained in an input image signal;
an interpolator generating a synthetic image signal utilizing at least one of an output from the first color converter and the input image signal;
the second color converter converting color information contained in the synthetic image signal and outputting the color information;
an image feature detector detecting a feature of the input image signal; and
an image adaptive interlocking controller controlling at least one of the interpolator and the second color converter according to the feature.

15. A method of color management comprising:
a first color conversion step converting color information contained in an input image signal;
an interpolation step generating a synthetic image signal utilizing at least one of an image signal converted in the first color conversion step and the image signal having been input;
a second color conversion step converting the color information contained in the synthetic image signal and outputting the color information;
an image feature detecting step detecting a feature of the input image signal by an image feature detector; and
an image adaptive interlocking controlling step controlling at least one process of the interpolation step and the second color conversion step according to the feature.

16. The method of color management of claim 15, wherein the first color conversion step is converting color according to a multidimensional look-up table.

17. The method of color management of claim 16, wherein the second color conversion step is converting color in a color space comprising hue, chroma, and lightness.

18. The method of color management of claim 16, further comprising:
a look-up table controlling step changing data in the multidimensional look-up table.

19. The method of color management of claim 15, wherein the image adaptive interlocking controlling step receives extraneous control information, and controls at least one process of the interpolation step and the second color conversion step according to the extraneous control information and the feature.

20. The method of color management of claim 19, wherein the image adaptive interlocking controlling step determines the ratio according to the extraneous control information.

21. The method of color management of claim 19,
wherein the extraneous control information is a signal representing information on external light: and
wherein the information on the external light is an illuminance level.

22. The method of color management of claim 15,
wherein the image feature detecting step detects the magnitude of a change of an input image signal between successive screens; and
wherein the image adaptive interlocking controlling step controls the interpolator to weaken a ratio of synthesizing an image signal converted in the first color conversion step when the magnitude of a change is within a given range.

23. The method of color management of claim 15,
wherein the image feature detecting step detects a signal level and occurrence frequency, in the color information of an input image signal, and
wherein the image adaptive interlocking controlling step controls the interpolation step to weaken a ratio of synthesizing an image signal converted in the first color conversion step when at least one of a signal level and occurrence frequency is within a given range.

24. The method of color management of claim 18, wherein the look-up table controlling step changes part of data in the multidimensional look-up table.

* * * * *